United States Patent [19]

Kadrmas

[11] Patent Number: 5,067,116
[45] Date of Patent: Nov. 19, 1991

[54] AUTOMATIC DISC CHANGER APPARATUS

[76] Inventor: Kenneth A. Kadrmas, 9114 Hogan Dr., Huntsville, Ala. 35802

[21] Appl. No.: 519,753

[22] Filed: May 7, 1990

[51] Int. Cl.⁵ .................. G11B 17/22; G11B 15/10
[52] U.S. Cl. .......................................... 369/37; 369/39
[58] Field of Search ................... 369/34, 35, 36, 37, 369/38, 39; 360/92

[56] References Cited

U.S. PATENT DOCUMENTS

| | | | |
|---|---|---|---|
| 2,997,304 | 8/1961 | Toolan | 369/37 |
| 3,050,309 | 8/1962 | Osborne et al. | 369/37 |
| 3,082,853 | 3/1963 | Rockola et al. | 369/37 |
| 3,247,737 | 4/1966 | Rockola | 369/37 |
| 4,750,160 | 6/1988 | Miller et al. | 369/37 |
| 4,791,626 | 12/1988 | Staar | 369/37 |

*Primary Examiner*—Stuart S. Levy
*Assistant Examiner*—Kenneth B. Wells
*Attorney, Agent, or Firm*—John C. Garvin, Jr.; Harold W. Hilton

[57] ABSTRACT

An automatic optical disc data storage and retrieval system. The system includes an enclosure disposed for orientation in various positions. An annular disc storage member (carrousel) is mounted in the enclosure and is disposed for receiving and storing optical discs in a plurality of open compartments regardless of the orientation of the enclosure. An insert and ejector mechanism is provided for moving the discs radially into and out of the compartments and at least one player assembly is provided for rotating and playing a disc. The player includes pivotal arms for moving a predetermined disc into and out of playing position. Control electronics are provided for controlling the operation of device.

27 Claims, 13 Drawing Sheets

AUTOMATIC DISC CHANGER APPARATUS

BACKGROUND OF THE INVENTION

The present invention relates to an automatic data storage and retrieval system and more particularly to such a retrieval system for retrieving and playing predetermined optical discs having data stored thereon and which are mounted in predetermined compartments of a rotatable disc storage device.

The use of discs having data, music etc., stored thereon is well known. Likewise, the use of devices such as phonographs, jukeboxes, etc. for retrieving the data (music, etc.) from the discs is well known. Typically, in an automatic storage and playing device such as a jukebox, the discs are made of plastic and the mechanism for storing the discs in the housing of the jukebox is a frame in which the discs are arranged in a linear array. In such systems a disc retrieval device is generally provided which must retrieve the disc, rotate it to a playing position and turn it up or down to permit the needle of the playing device to engage the desire surface. Such disc to player delivery systems are complicated. Some typical U.S. patents relating to such jukeboxes, all assigned to the Seeburg Corporation, is as follows: U.S. Pat. Nos. 2,622,144; 2,624,795; 2,716,550; 2,729,240; 2,760,780; 2,923,553; and 3,701,970. While the above patens either generally or directly relate to selecting apparatus for phonographs, none of the above patents disclose the provisions of carrousel type of disc storage racks nor do the patents disclose mechanisms for retention, removal and reinsertion of the discs in carrousel type storage racks.

Patents relating to carrousel type of storage racks have been issued to Kenneth C. Miller and bear U.S. Pat. Nos. 4,815,057 and 4,750,160. Both patents relate to a multiple-player disc-changer apparatus. Both of these patents include a disc storage rack that stores the discs in a toroidal arrangement surrounding the disc player. The structure includes a disc selecting mechanism for selecting a disc for loading onto the data input/output device (player), a disc staging mechanism for transferring the selected disc from the disc storage rack to a position adjacent to the disc player, and a spindle loading mechanism for loading the selected disc onto the spindle of the player.

A requirement of both of the above discussed patents is that the toroidal disc storage rack be rotatable about a vertical axis so that the discs must be rolled along a horizontal surface in a radial direction between the load position and the staged position. Such structure provides unnecessary and undesirable constraints as to the physical orientation of the apparatus. Applicant's device, on the other hand, eliminates these undesirable and unnecessary constraints by providing a structure which is not limited in its physical orientation.

Additionally, it is to be understood that the automatic optical disc data storage and retrieval system of the present invention can be utilized for any type of optical disc such as an audio CD, a CD-ROM, or a video CD.

SUMMARY OF THE INVENTION

An automatic optical disc data storage and retrieval system wherein optical discs are stored in a compartmentized, rotatable carrousel and retrievable therefrom for playing in data input/output devices or players. The system includes an insert/eject mechanism for inserting or ejecting an optical disc to or from a predetermined compartment of the carrousel. A player includes the operating mechanism for retrieving a predetermined disc from a predetermined compartment and moves the disc into playing position in the player where an optical (laser) pickup "plays" the disc. The operating mechanism returns the disc to the predetermined compartment after the playing has been completed. The operating mechanism moves the selected disc radially outwardly from the carrousel in a linear path into the player and returns the disc in a linear path, in a radially inward direction relative to the carrousel.

It is an object of the present invention to provide an automatic optical disc data storage and retrieval system.

It is another object of the present invention to provide such a system with a control mechanism for automatic control of the system.

It is still another object of the present invention to provide such a system with a carrousel which is provided with compartments for storing the optical discs therein.

It is yet another object of the present invention to provide means for retrieving a predetermined disc from a predetermined compartment for playing said disc and for returning said disc to said compartment.

It is still yet another object of the present invention to provide means for moving the disc in a linear path to and from the player mechanism and the carrousel.

These and other objects of the present invention will be more readily apparent from a study of the following description and accompanying drawings.

DESCRIPTION OF THE PREFERRED EMBODIMENT

Figure 1:
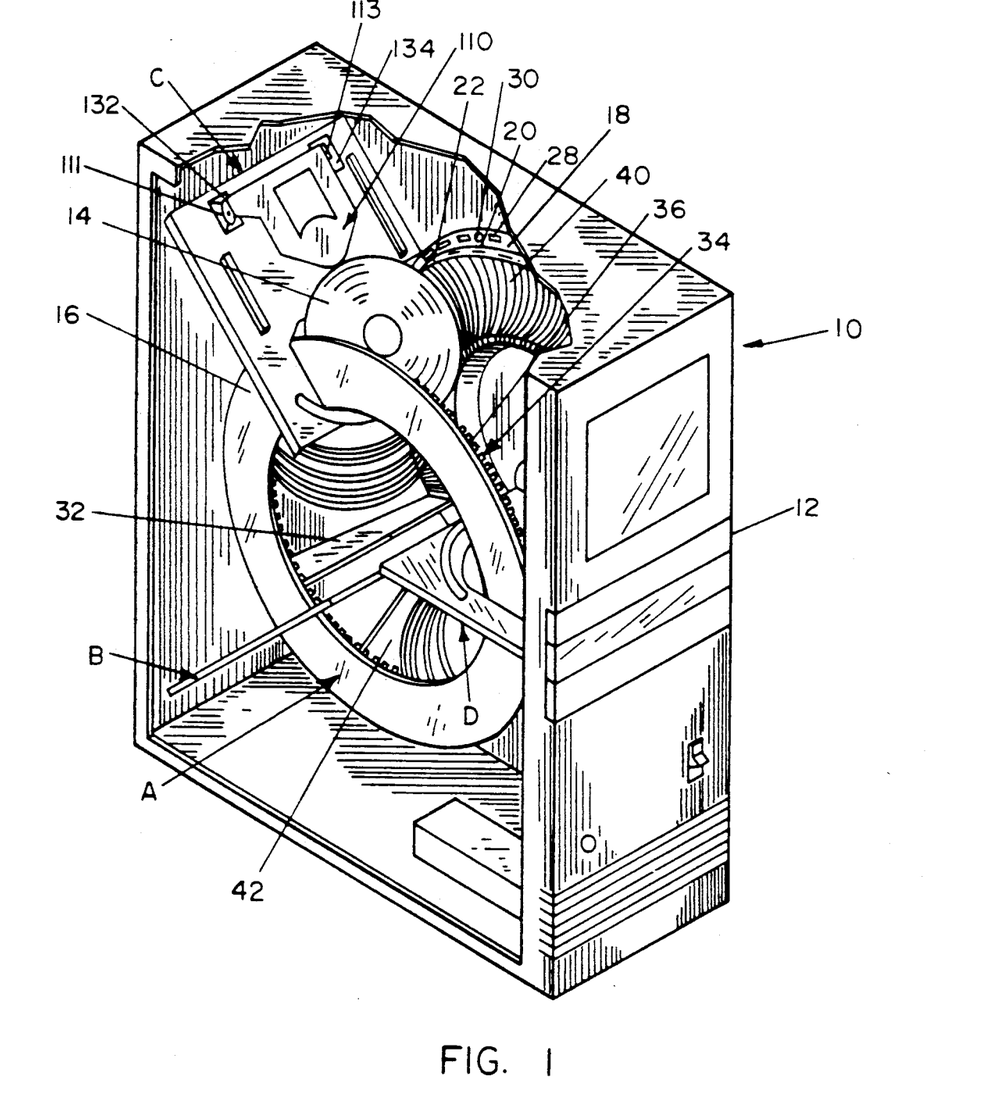
FIG. 1 is a pictorial, partially cut-away view of the automatic optical disc data storage and retrieval system of the present invention.

As seen in FIG. 1, the automatic optical disc data storage and retrieval system 10 of the present invention is shown to include an enclosure 12 housing an annular rotatable disc storage device or carrousel A, a pair of optical disc player mechanisms B and C disposed in fixed position relative to storage device A and an optical disc eject and insert mechanism D. Disc storage device A stores a plurality of optical discs 14 in an annular configuration. The optical disc players B and C include optical data pickup means for playing a predetermined disc once the disc is positioned in a player by a pair of loading and unloading levers of the player. The optical disc eject and insert mechanism D is arranged for loading and unloading the optical discs into and out of rotatable storage device A and the system in general.

Figure 2:
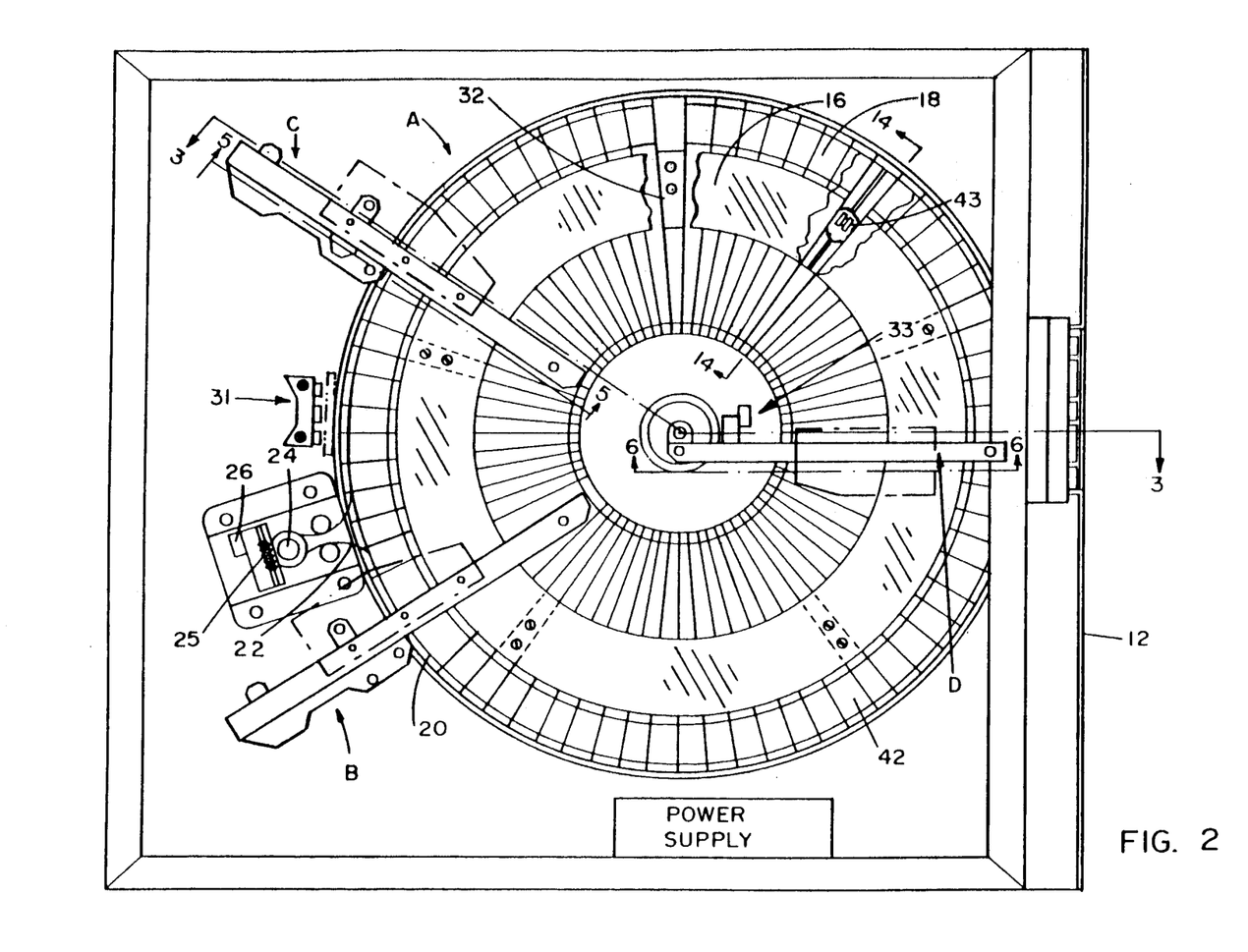
FIG. 2 is an elevational view of the device of FIG. 1 with an enclosure panel removed to show the some components including the carrousel, two disc players and the disc insert/eject mechanism.

As further seen in FIGS. 1 and 2, the annular storage device or carrousel A includes an upper annular plate 16 and a lower circular flat plate 18 having a track 20 around the periphery thereof. A belt 22 is disposed in track 20 and around a driving pulley 24 (FIG. 2) which is rotated by a worm gear 25 which in turn is rotated by an electric motor 26 for rotation of annular disc storage device A.

The disc storage device is provided with a plurality of indexing slots 28 ( FIG. 1) around the peripheral edge thereof including a reference or "home" slot 30. Slots 28 and 30 cooperate with a location sensor optical pick up device 31 (FIG. 2) for locating a particular disc, as discussed hereinbelow. A plurality of support struts 32 are disposed in peripheral spaced relation to secure the upper annular plate 16 and lower circular flat plate 18 together in spaced relation. Some of the struts are omitted in FIG. 1 for clarity but are illustrated in FIG. 2. Circuit boards are illustrated in phantom in FIG. 2.

Figure 16:
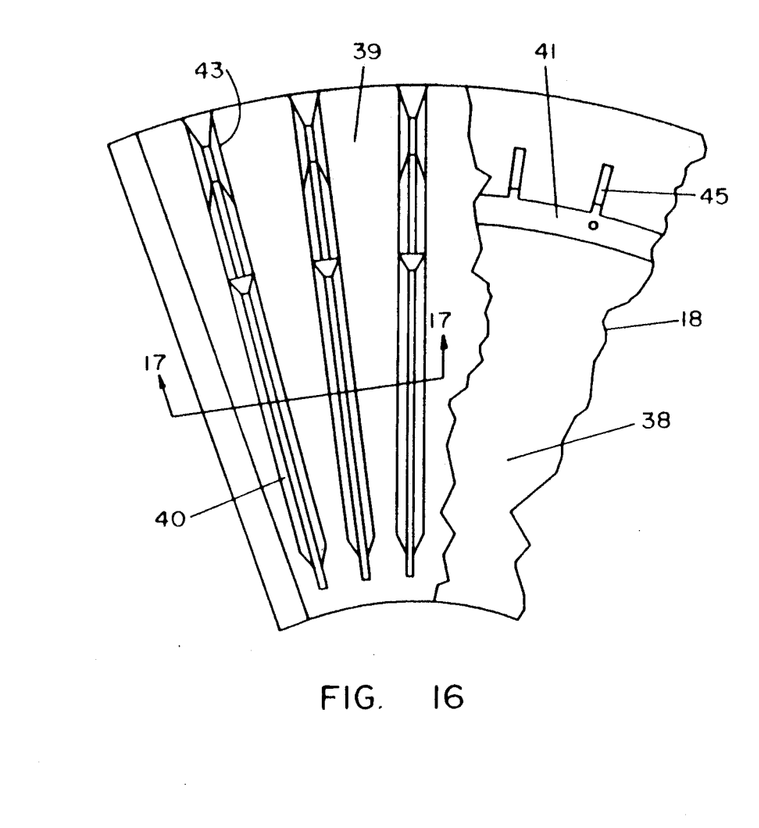
FIG. 16 is a plan view, partially broken away, illustrating a portion of one of a plurality of segments which when assembled to the circular rotatable base member of the carrousel provides the grooves which support the compact disc in the carrousel assembly. The disc retainer spring assembly of FIGS. 1 and 14 is also shown.
Figure 17:
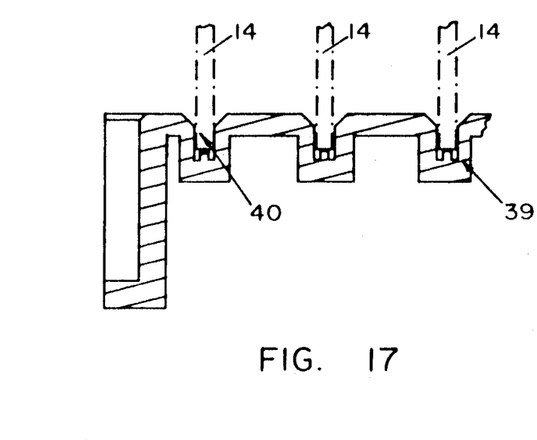
FIG. 17 is a sectional view taken along line 17—17 of FIG. 16.

Upper annular plate 16 is provided on its lower surface 34 with a plurality of segmented members 35 which abut against struts 32 (FIGS. 1,2). Each segmented member is provided with a plurality of spaced grooves 36 and are secured to upper plate 16 to form an annular configuration therewith. Lower circular plate 18 is provided on its upper surface 38 with a similar plurality of segmented members 39 having spaced grooves 40 (FIGS. 1, 16 and 17). Grooves 36 and 40 are in aligned relation forming disc compartments 42 therebetween. The disc compartments 42 are arranged to receive an optical disc therein.

Figure 15:
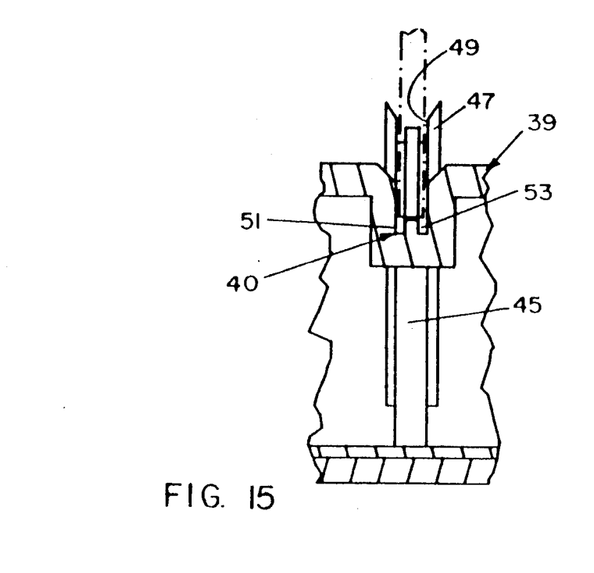
FIG. 15 is a sectional view taken along line 15—15 of FIG. 14.

An optical disc retainer device 43 (FIGS. 3, 5, 6, 14 and 16) is provided to retain the discs in the carrousel regardless of carrousel physical orientation. Retaining device 43 includes a plurality of arcurate spring assembly segments 41 secured to the upper surface 38 of lower circular plate 18. Each spring segment is provided with a plurality of resilient spaced arms 45 which extend for engagement with a pivotally mounted disc engaging roller 47. Springs 45 are disposed for biasing roller 47 upwardly against the periphery of an optical disc for retention of the disc in a compartment. The roller is provided with a groove 49 to receive the edge of the disc therein (FIG. 15) and grooves 40 of members 39 are further cut-away at edges 51 and 53 thereof so that outer peripheral edges of the compact disc will not bind at the bottom edges of the grooves. (FIG. 15).

Figure 3:
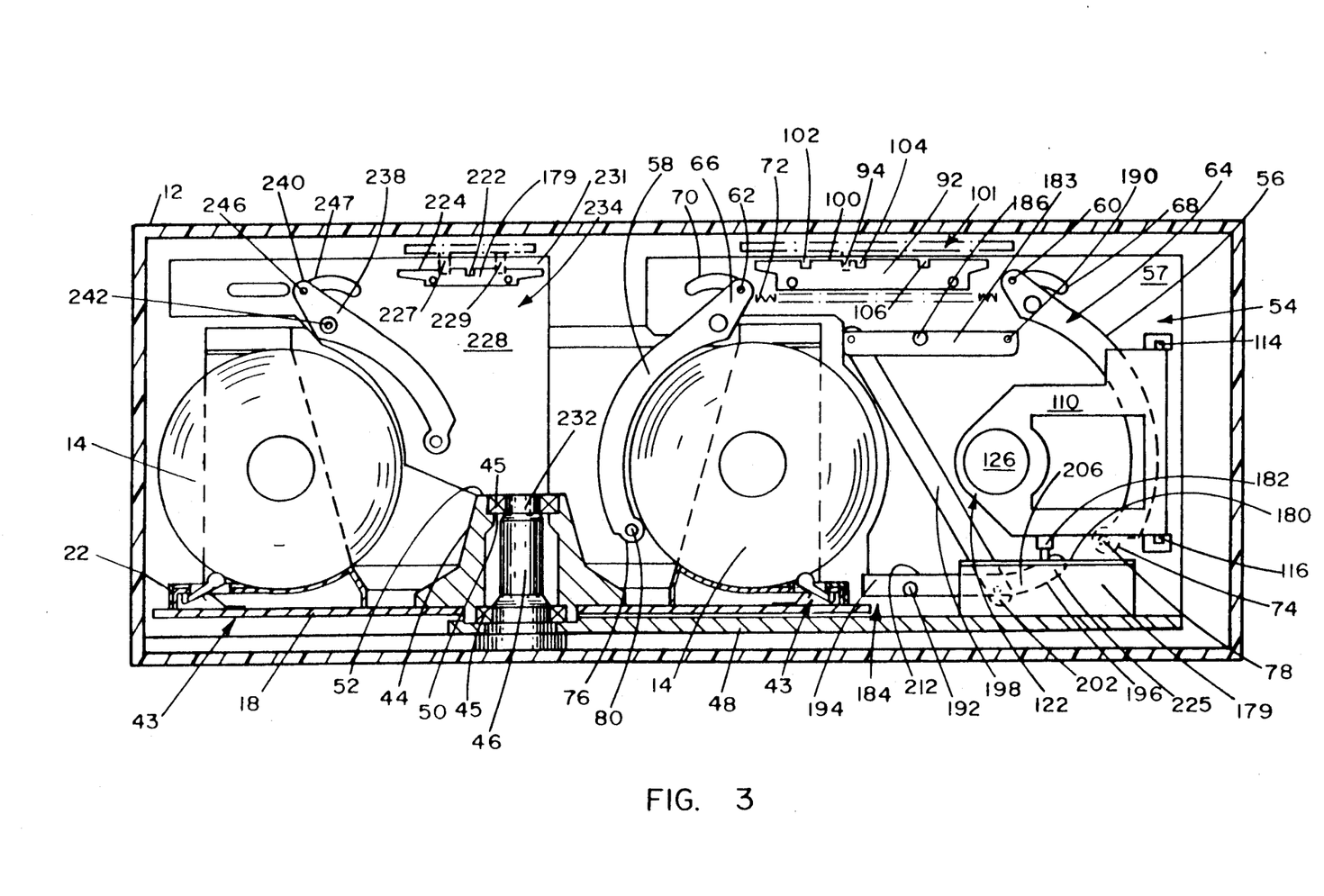
FIG. 3 is a sectional view taken along line 3—3 of FIG. 2 illustrating an optical disc player and the insert-/eject mechanism.
Figure 6:
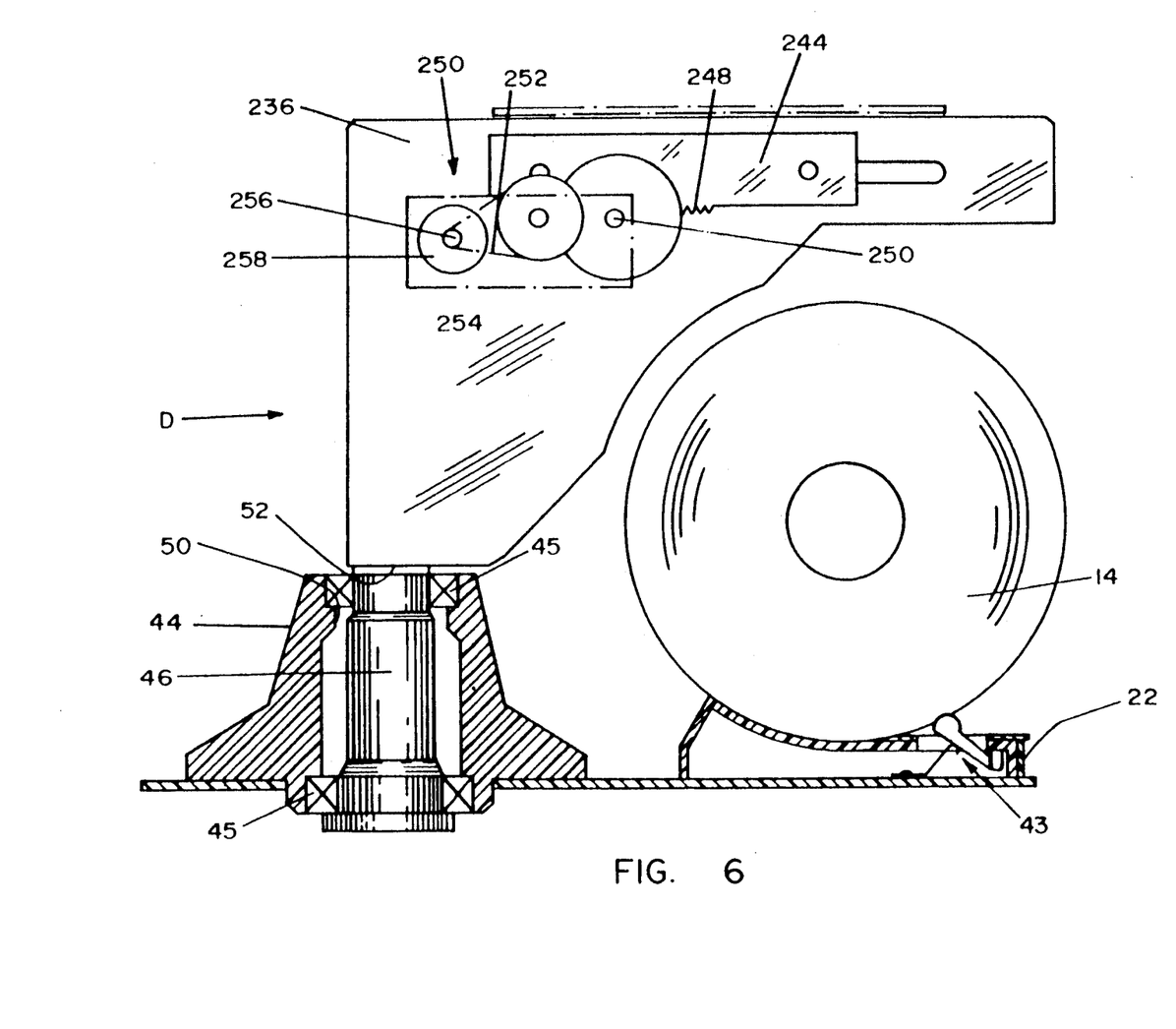
FIG. 6 is a sectional view taken along line 6—6 of FIG. 2 illustrating the mechanism for pivotal movement of the insert/eject arm of the optical disc insert/eject mechanism and also illustrating a portion of the carrousel.
Figure 7:
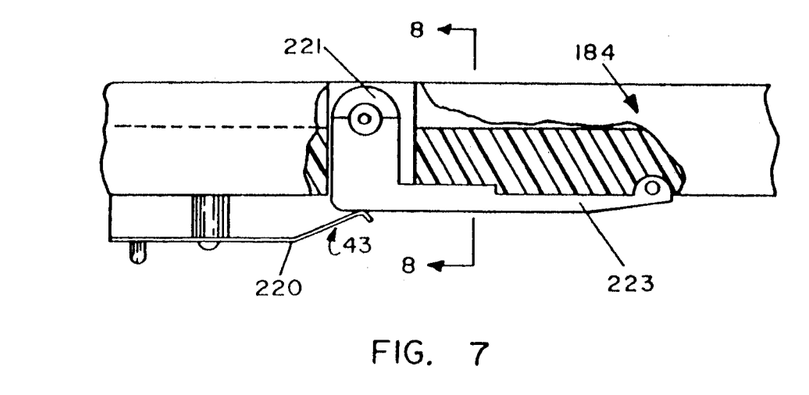
FIG. 7 is an enlarged view, partially in section, of the retaining device used for retaining the optical disc in the guide members of the guide channels provided on the player mechanisms.
Figure 8:
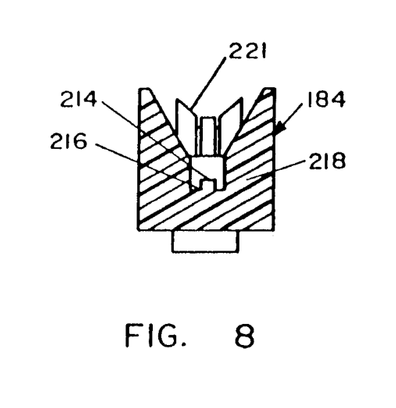
FIG. 8 is a sectional view taken along line 8—8 of FIG. 7.
Figure 9:
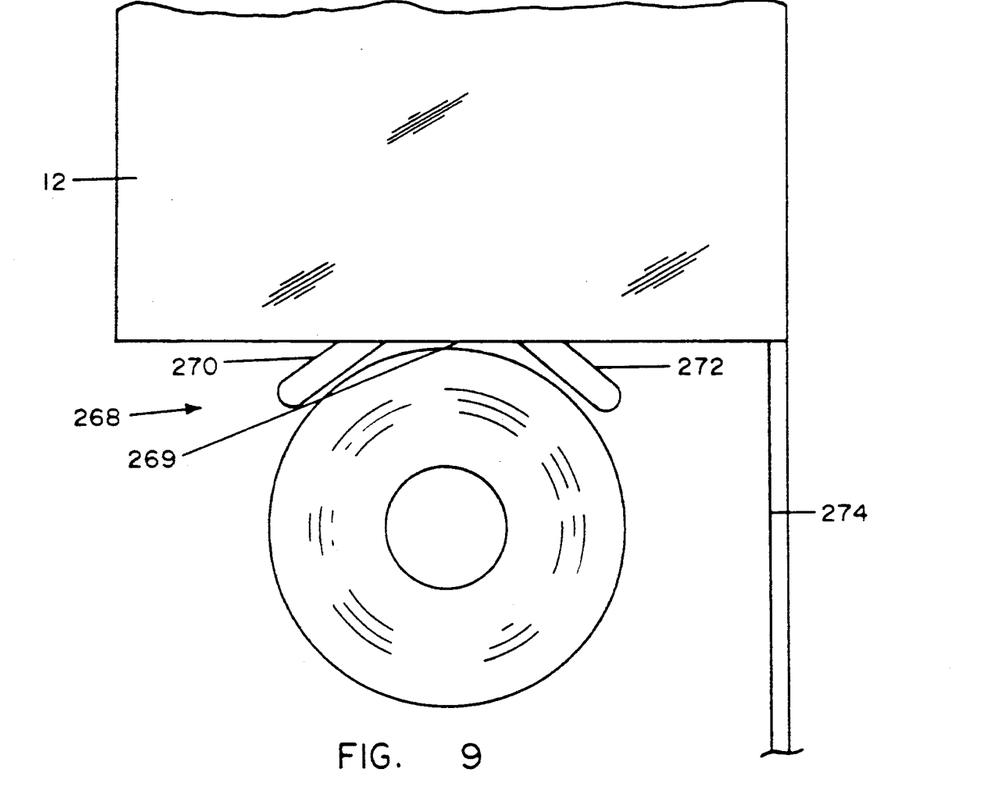
FIG. 9 is an elevation view of the enclosure and illustrates a disc gripper mechanism for insertion or removal of a disc into or out of the enclosure.
Figure 10:
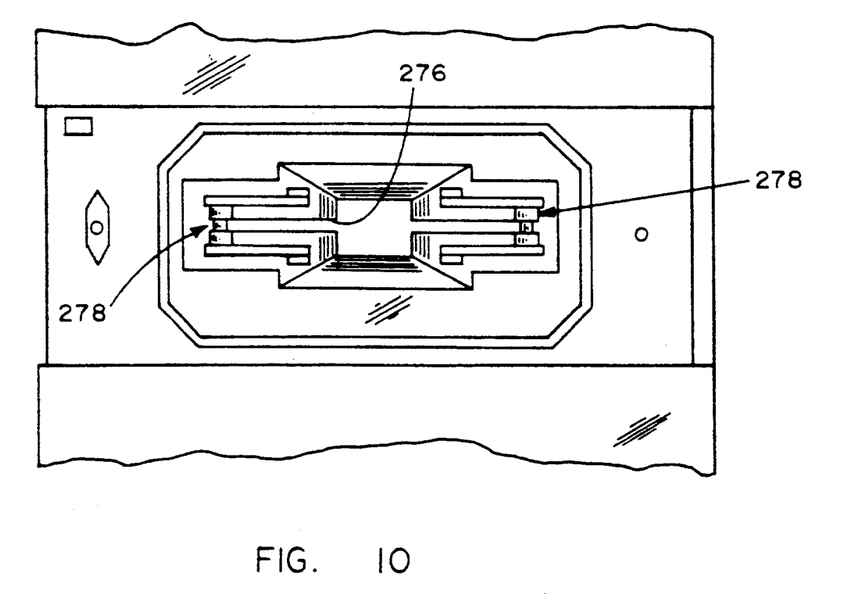
FIG. 10 is a front view of the device of FIG. 9.
Figure 11:
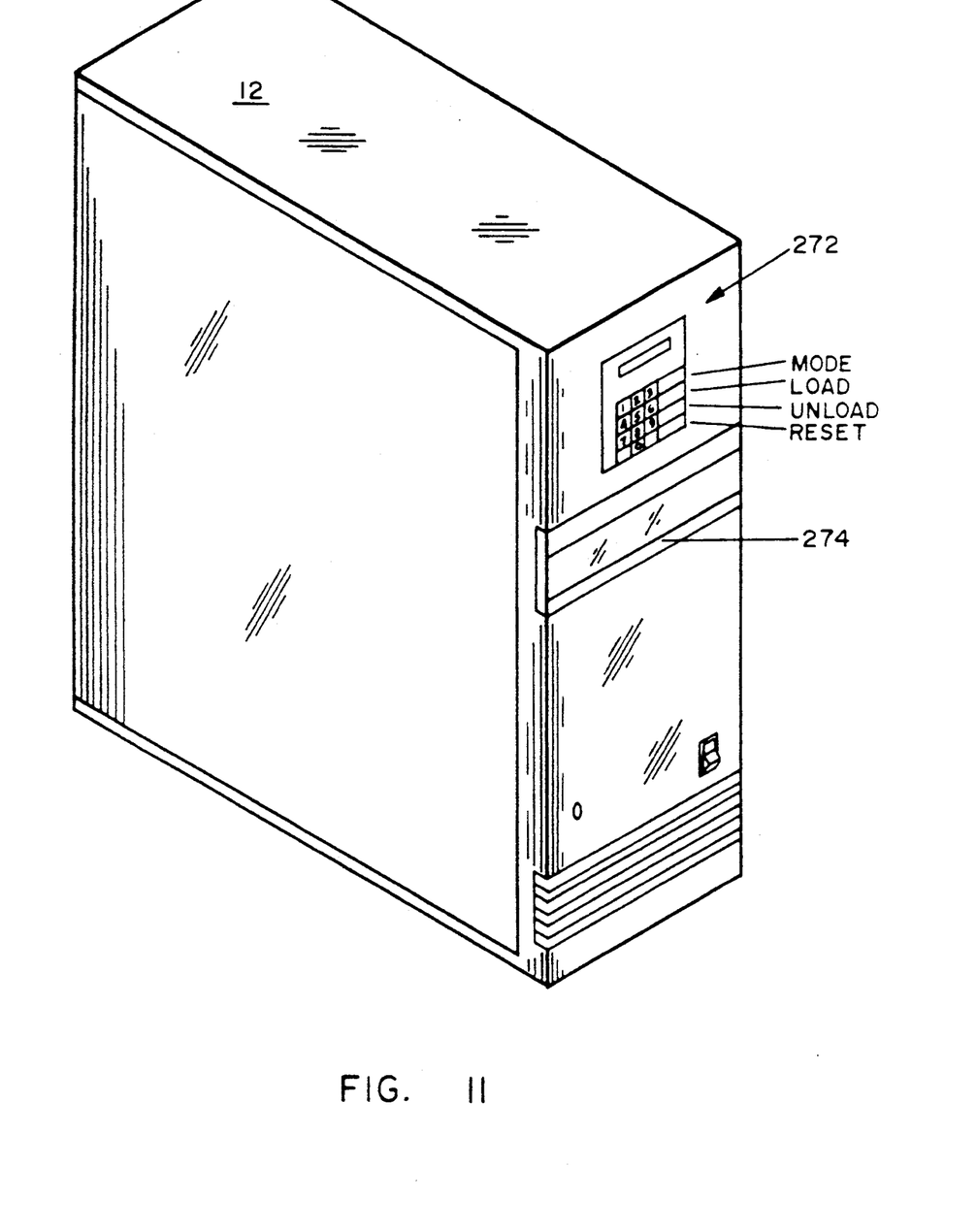
FIG. 11 is a pictorial view of the enclosure for the subassemblies of the system.

To rotatably support the disc storage device A in enclosure 12, a hub 44 is provided at the center of plate 18 for mounting on a shaft 46 (FIGS. 3 and 6) which extends upwardly for a triangular "floating" alignment plate 48 which is secured to enclosure 12 (FIG. 3). The shaft 46 extends upwardly through a central opening 50 of hub 44 to support one end 52 of an optical disc eject and insert mechanism D (FIG. 6). Duplex bearings 45 are mounted on shaft 46 for rotatable support of hub 44. Assembly A forms a turning table which is rotated by belt 22 and motor 26 until a specific slot or groove has been recognized by the location sensor optical pickup subassembly 31 in the manner described hereinbelow.

The carrousel is designed to maximize the storage capability with future capacity growth options while providing a storage array that can easily support two or more optical disc players B and C. The carrousel design ensures that the actual "playing" surface or data area of the optical disc is never in contact with any mechanical element of the system, thus ensuring the integrity of the disc. The carrousel also includes grooves to receive and store the optical discs therein. The grooves or guide channels are designed to eliminate the sharp edge frictional effects of various manufacturers' discs. The hub and bearing support provides for uniform operational characteristics over a long lifetime regardless of carrousel orientation. The specific size/diameter of the carrousel is a critical mathematical relationship between the optical disc spacing and the optical position location sensor spacing to provide a simple yet precise encoding system utilizing the precisely located indexing slots 28 and reference or "home" slot 30. The optical position location sensor subassembly 31 provides a home index signal, an optical disc slot index signal, and an optical disc slot lead in signal. These signals uniquely provide precise positioning and carrousel start/stop motion control. The digital gate logic (FIG. 12), described hereinbelow, is used to create these signals.

The optical player mechanisms B and C are in fixed position relative to the carrousel mechanism A. Precise alignment between the player mechanisms B and C and the carrousel is maintained by the rigid, vibration damping cast base plate 48 (FIG. 2). Locator pins (not shown) are provided to assure precise alignment between the carrousel and the optical disc players. As seen in FIG. 3, the optical disc players B and C include a chassis 54 having loading/unloading arms 56 and 58 pivotally mounted to one surface 57 thereof. A pair of pins 60 and 62 are secured to ends 64 and 66 of arms 56 and 58, respectively, and the pins are extended through a pair of accurate slots 68 and 70 of the chassis. A spring 72 connects ends 64 and 66 of the arms together for mutual pivotal movement therebetween. Each arm 56 and 58 is provided with a distal end 74 and 76 having rollers 78 and 80 respectively mounted thereon.

Figure 5:
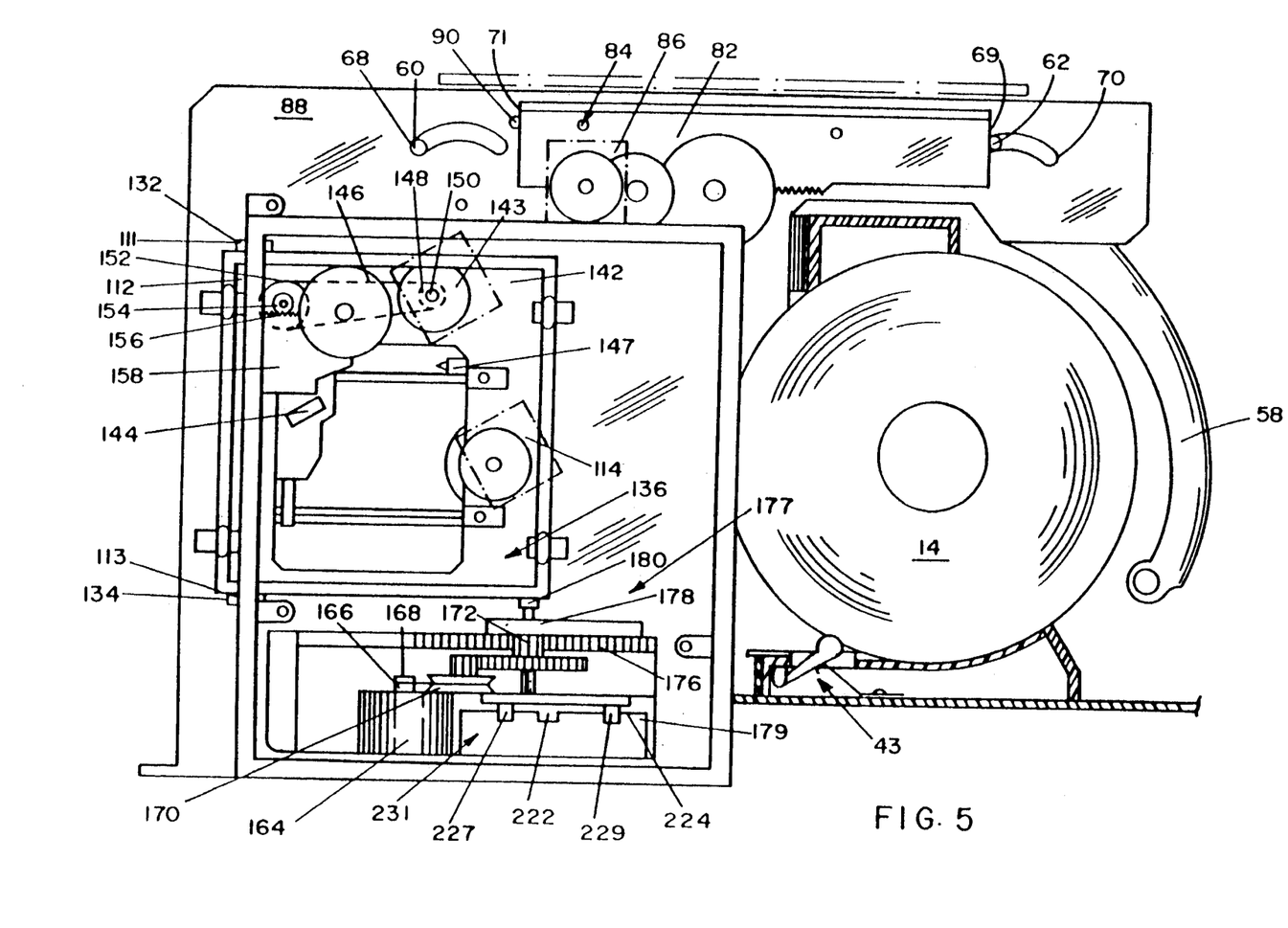
FIG. 5 is a sectional view taken along line 5—5 of FIG. 2 illustrating the mounting of the motors and optical data pickup device on the chassis of a player and also illustrating a portion of the carrousel.

Pins 60 and 62 extend through arcurate slots 68 and 70 and are disposed for engagement by the ends 69 and 71 of a slidable rack 82 of a rack and pinion gear assembly 84. The gears are operated by a motor 86 mounted on the surface 88 of the chassis (FIG. 5). Sliding movement of rack 82 causes pivotal movement of arms 56 and 58 by movement of pins 60 and 62. An elongated groove 90 is provided in the chassis to receive an optical slider bar 92 which is integral with rack 82 but mounted on the other side 57 of the chassis (FIG. 3). As seen in FIG. 3, the slider bar 92 is provided with an indentation or notch 94 on the upper surface 100 thereof. A sensor subassembly 101 which includes three photointerrupters 102, 104 and 106 is mounted adjacent to the optical slider bar 92. Photointerrupters 102, 104 and 106 are disposed for registry with notch 94 to control motor 86 (FIG. 5) and insure that the loading/unloading levers 56 and 58 are in either of three positions corresponding to the three photointerrupters. These positions are load complete, unload complete and neutral. Extension spring 72 forces both levers to track with the optical slider 92.

To secure the optical disk in the player, a clamping device 108 (FIGS. 3 and 5) is provided and is comprised of a pair of plates 110 and 112 (FIGS. 3, 4 and 5) disposed in hinged relation on surface 57 of the chassis. Plate 110 (FIG. 3) includes hinges 114 and 116 at the upper and lower surfaces 118 and 120 thereof for pivotal support of plate 110 on the surface 57 of the chassis. Plate 110 also includes a distal end 122 provided with an opening 124 (FIG. 3) having a spindle cap 126 mounted loosely therein. As seen in FIG. 4, spindle cap 126 is provided with a magnetic circular plate 128 housing a recess 130 in the center thereof.

Figure 4A:
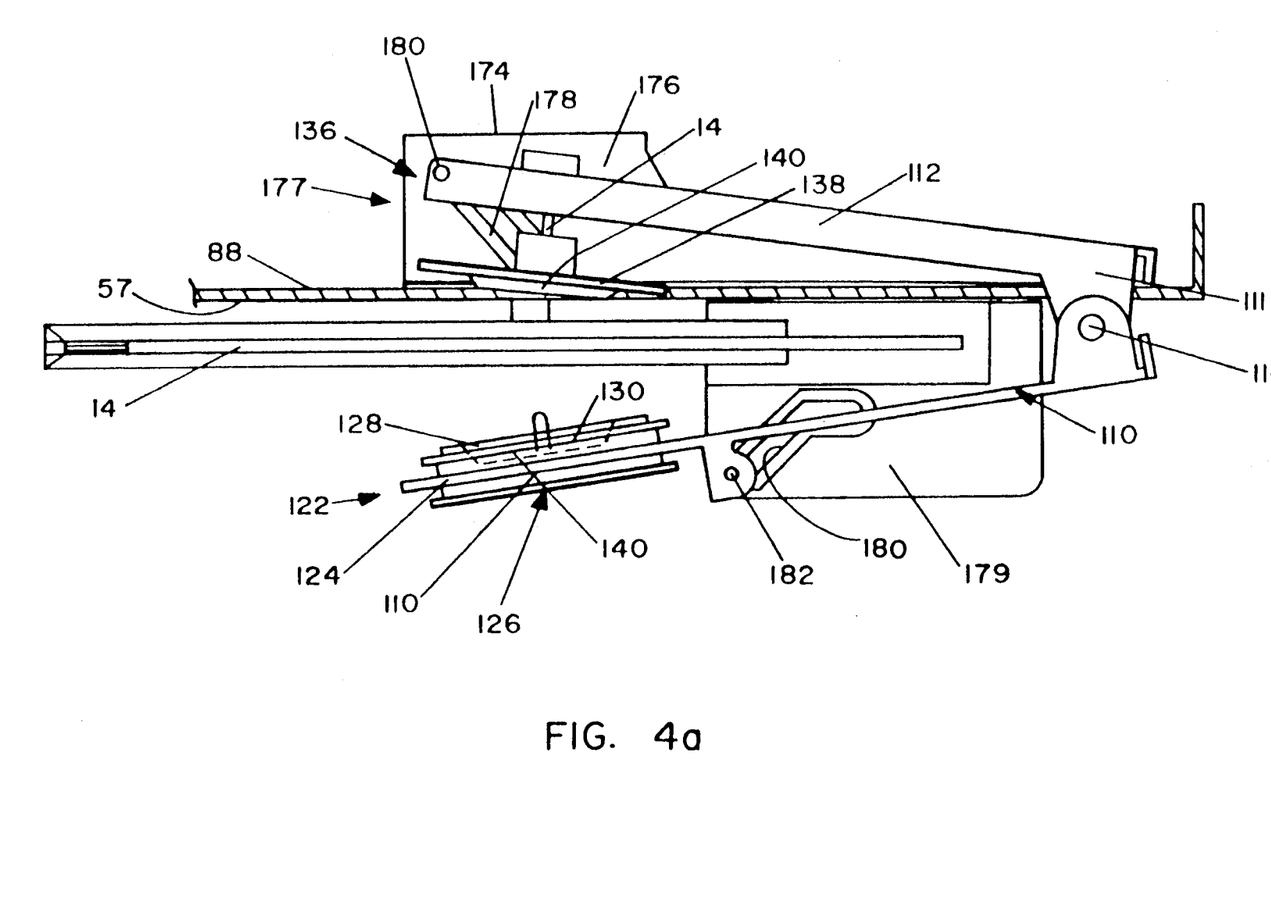
FIGS. 4a and 4b are enlarged partially sectional views illustrating the laser disc pickup and clamper assembly of FIG. 3 in opened and closed positions, respectively.
Figure 4B:
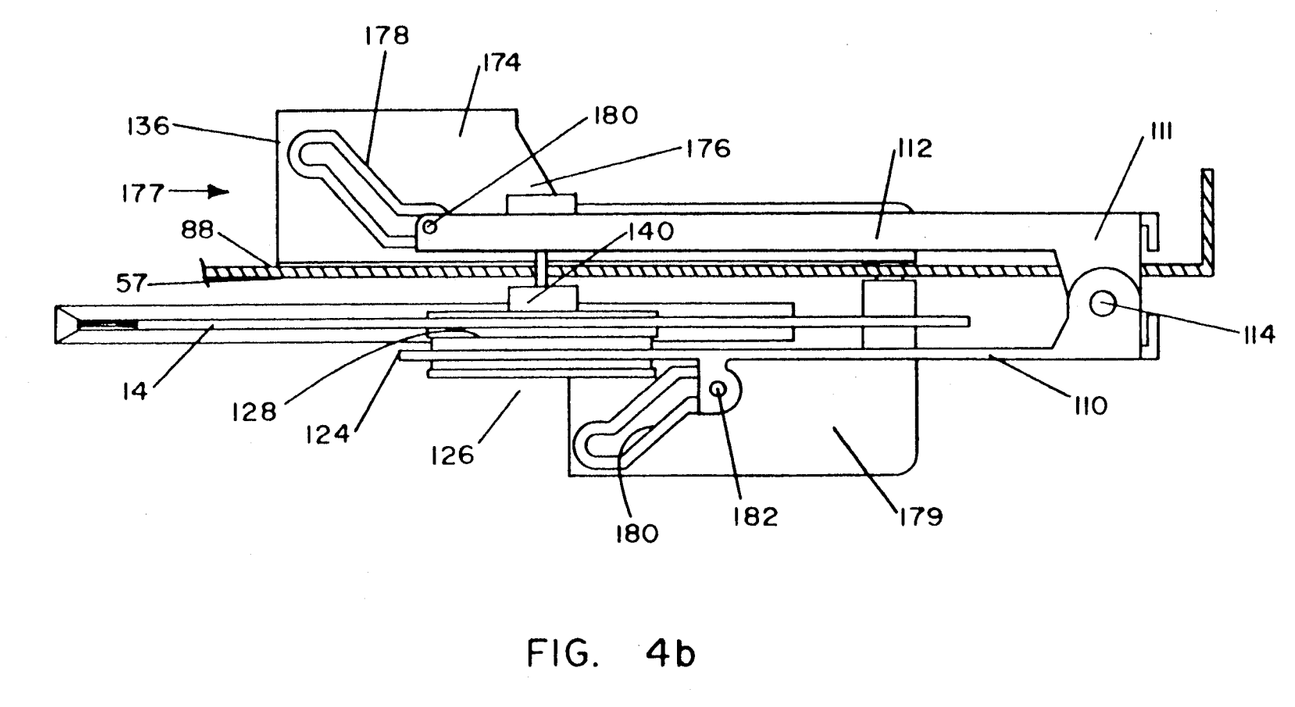

Plate 112 (FIGS. 4a, 4b and 5) includes a pair of extending ears or members 111 and 113 (FIG. 1) which extend through a pair of spaced openings 132 and 134 in the chassis for secured relation with hinges 114 and 116 of plate 110. The distal end 136 of plate 112 (FIGS. 4a and 4b) is provided with flanged member 138 having a protruding disc player spindle 140 for insertion into recess 130 of circular plate 128. Flanged member 138 is secured to a shaft 14 which extends through plate 112 for secured relation with an electric motor 114 (FIG. 5) mounted on the back surface 142 of plate 112. Again, as seen in FIGS. 4a and 4b, the flanged member 138 and spindle cap 126 including the magnetic plate 128 are arranged to clamp the center of the disc therebetween for rotation responsive to actuation of motor 114.

As seen in FIG. 5, plate 112 has a second electric motor 143 secured to surface 142 thereof for movement of optical disc data pickup device 144 radially across the optical disc when the disc is in a player. To accomplish this, a belt 146 is mounted in a pulley 148 mounted to the output shaft 150 of motor 143 and extends around a second pulley 152 mounted on plate 112. Pulley 152 rotates a gear 154 which in turn moves a gear 156 of a rack 158 and pinion. The rack 158 is made to move in a linear path radially across the optical disk and optical data pickup device 144 mounted on the moveable rack is made to sense the disc as it rotates beneath the pickup.

A limit switch 147 is mounted on plate 112 for engagement by the rack as the rack reaches the end of its travel. The limit switch 147 reverses the movement of the optical data pickup device 144.

To move plates 110 and 112 into and out of engaged relation with an optical disc, an electric motor 164 is mounted on surface 88 of the chassis and is provided with an output shaft 166 having a pulley 168 thereon (FIG. 5). A second pulley 170 and gear 172 is disposed for driving a gear 174 of a rack 176 of a rack and pinion assembly 177 position on surface 88 of the chassis. The rack 176 includes a cam surface 178 thereon into which a cam roller (follower) 180 mounted on the distal end 136 of plate 112 is positioned. Rack 176 includes an optical slider bar portion 179 integral therewith but positioned on the reverse surface 57 of chassis 54. The slider bar 179 includes a cam surface 180 thereon into which a cam roller 182 mounted on the distal end 122 of plate 110 is positioned. The cam surfaces (tracks) 178 and 180 are mirror images of each other and rotation of the output shaft 166 of motor 164 causes sliding movement of rack 176 and optical slider bar 179 which causes the cams 178 and 180 to move, thus forcing the cam rollers of each plate 110 and 112 to follow the tracks (cam surfaces) on the moving members 178 and 180. Movement in one direction spreads the plates 110 and 112 apart to receive the optical disc therebetween. Movement of members 178 and 180 in the reverse direction forces the plates 110 and 112 together for clamped relation of the optical disc between the plates.

A pair of spaced guide members 183 and 184 are mounted on surface 57 of the chassis. Upper guide member 183 is shown to be pivotally mounted to surface 57 by a pin 186 and is provided with end portions 188 and 190. Lower guide member 184 is shown to be mounted top surface 57 by pin 192 and is provided with end portions 194 and 196. A diagonal bar 198 having end portions 200 and 202 is connected to the guide members 183 and 184 for mutual movement of the two guide members. End 200 of bar 198 is secured to end 188 of guide member 183 by a pin 204, and end 202 of bar 198 is secured to guide 184 by a pin 206. Pin 206 also extends through an elongated slot of the chassis for secured relation with rack 176 (FIG. 5) of the rack and pinion assembly 177 for movement with rack 176. The cam surfaces 178 and 180 (FIG. 4) are configured so that as rack 176 and optical slider bar 179 move a predetermined amount in a first direction the guide members 183 and 184 will close on the peripheral edge of the optical disc, clamping the disc between the guide members. A slight further movement of rack 176 and bar 179 will force the guide members 183 and 184 to pivot away from the optical disc to permit unobstructed rotation thereof. Reversing the direction of rotation of motor 164 moves the rack 176 and optical slider bar 179 in the reverse direction to close guide members 183 and 184 against the periphery of the optical disc while releasing the plates 110 and 112 from engagement with the disc.

Guide members 183 and 184 are provided with channels 210 and 212, respectively to receive the optical disc therein. The channels are formed with a raised central surface 214 having a pair of deeper indented portions 216 and 218 on opposite sides thereof. Such configuration prevents the periphery of the disc from binding in the channels. Lower guide member 184 is provided with a retainer device 185 comprised of a leaf spring 220 disposed in bias relation with a roller 221 secured in an arm 223 which is pivotally secured to member 184. The spring biased roller exerts sufficient pressure against the optical disc when the disc is clamped between the guide members to retain the optical disc between the guide members regardless of the orientation (horizontal or vertical) of the player.

Additionally, the lower guide member 184 is provided with a curved portion 225 (FIG. 3) at the end 196 thereof to serve as a stop for the optical disc. This curvature positions the disc center directly in line with the optical disc player spindle and the optical disc is held in this position by the action of the retainer device 43 in one of optical disc player guide channels.

Optical slider bar 179 is provided with a notch 222 on its upper surface 224 which when positioned relative to two photointerrupters 227 and 229 of a sensor subassembly 231 mounted on the chassis causes actuation of motor 164 to assure that clamping/unclamping action is in either of two positions. These positions are indicated as clamp complete and unclamp complete. In addition, a reflective optical sensor 226 mounted on surface 57 of the chassis indicates whether an optical disc is in the player guide channels.

The insert/eject mechanism D provides the capability to insert and eject optical discs to and from the automatic optical disc data storage and retrieval system. Normally this function is performed through the interactive keypad and display facilities of the system front panel controls 230. The user is required to indicate whether an optical disc is to be inserted or ejected and then must also specify the slot number in the carrousel that the optical disc is to be inserted or ejected from. The insert/eject system works in conjunction with the front panel commands.

As seen in FIGS. 3 and 6 the insert/eject assembly D includes a chassis 228 having an "L" shaped configuration. End 52 of chassis 228 is secured to the top 232 of shaft 46 on which carrousel hub 44 is supported. The chassis is provided with opposing surfaces 234 (FIG. 3) and 236 (FIG. 6) and an insert/eject lever 238 has one end 240 pivotally mounted by a pin 242 on surface 234 for pivotal support of lever 238. The pivotal movement of level 238 imparts sliding movement to an optical slider bar 244 mounted on surface 236 of the chassis. Connection is made between pivot arm 238 and the optical slider bar 244 by a pin 246 which pivotally secures the slider member 244 to lever 238. Pin 246 is movable in an accurate groove 247 provided in the chassis. Movement is imparted to lever 238 by movement of a rack 248 (FIG. 6) integral with optical slider bar 244. As seen in FIG. 6, rack 248 is movable through a gear train 250 which is rotated by a belt 252 driven by a pulley 254 mounted on shaft 256 of a motor 258 mounted on the chassis. Optical slider bar 244 is provided with a uniquely positioned notch 260 that, when positioned relative to three photointerrupters 262, 264 and 266, of a sensor assembly 267, controls operation of motor 258 to insure that the insert/eject levers 238 are in either of three positions. These positions are labeled optical disc ejected, lever retracted, and optical disc insert prompt position.

To insert or remove a disc from the device a spring loaded optical disc gripper 268 is provided at the edges of an opening 269 in enclosure 12. The gripper includes a pair of spring loaded arms 270 and 272 which open when opening a door 274 in the enclosure, to receive an optical disc therebetween upon ejecting. A roller 278 is secured at the ends of each arm.

Figure 12:
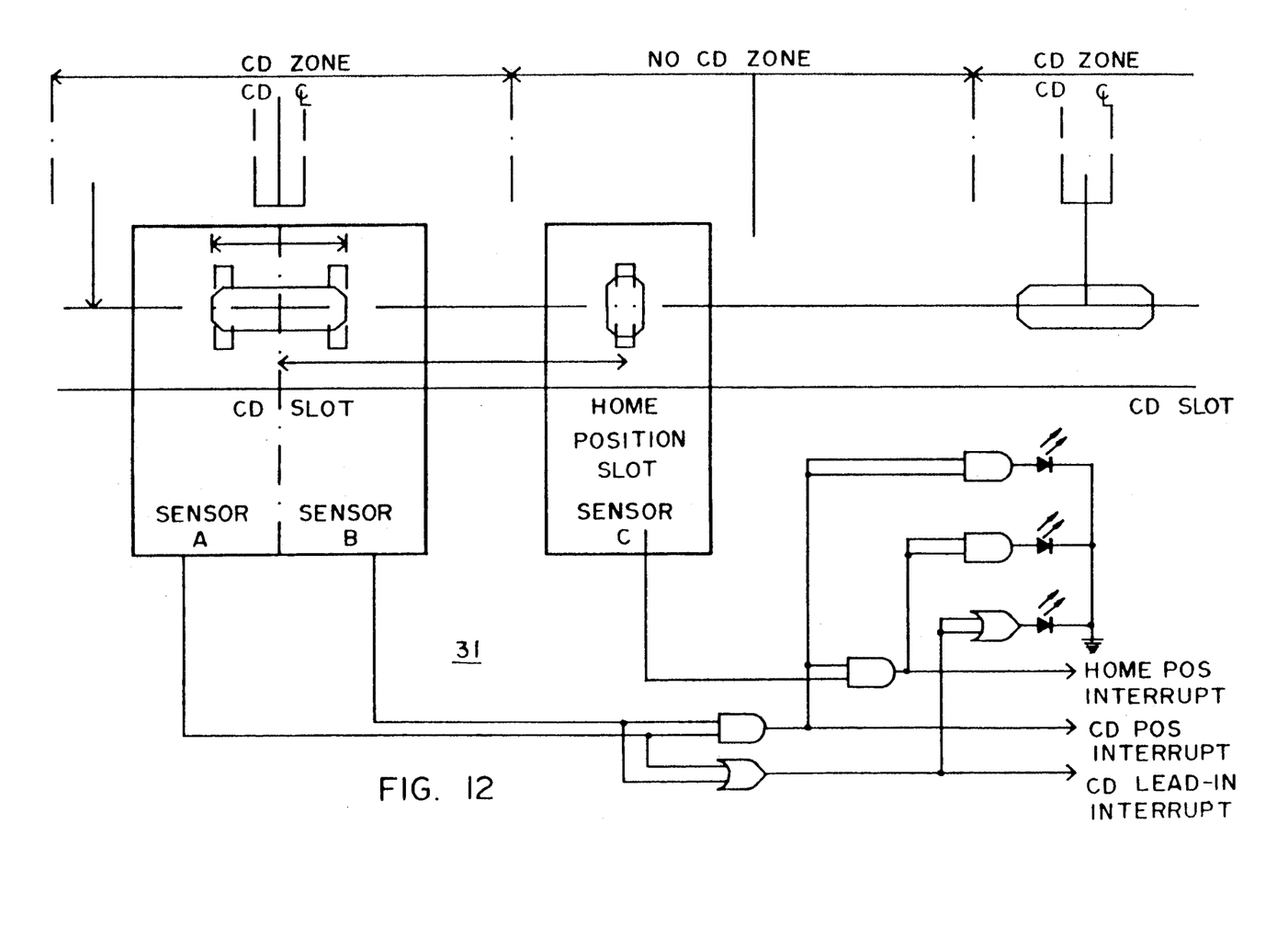
FIG. 12 is a diagrammatic view of the carrousel positioning scheme.
Figure 13:
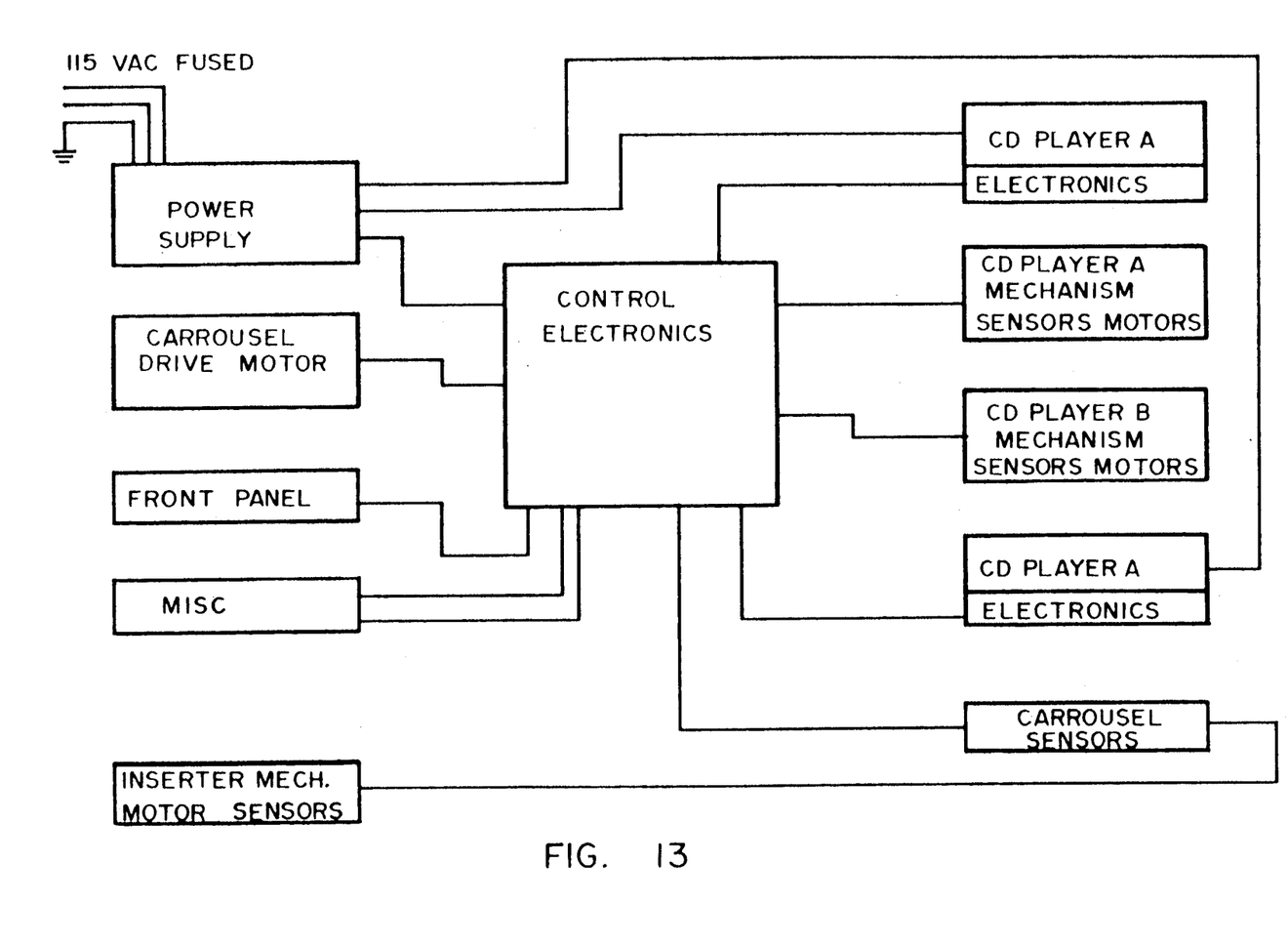
FIG. 13 is a block diagram of the electronic control subsystem for the automatic data storage and retrieval system of the present invention.
Figure 14:
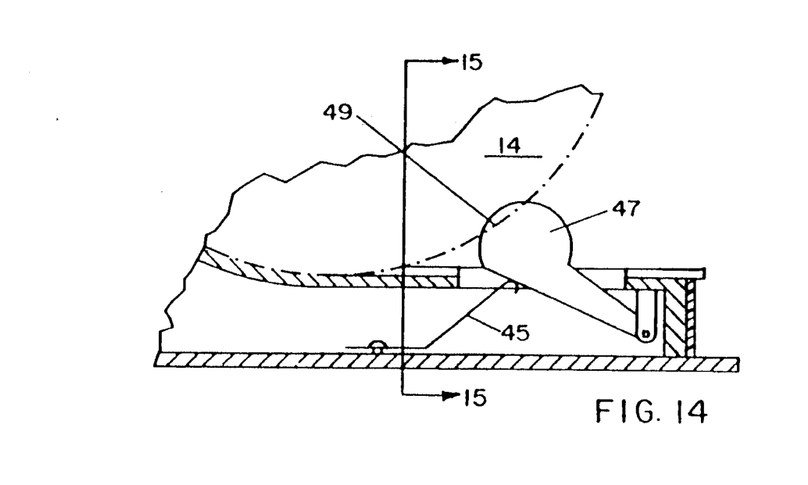
FIG. 14 is a sectional view taken along line 14—14 of FIG. 2 and provides additional details on the retaining device used for retaining the optical discs in the carrousel.

In operation a user selects an optical disc, previously inventories by photointerrupter subassembly 31, among the optical discs stored in the carrousel A and addresses a keyboard 270 on a front control panel 272. The carrousel drive motor 26 then causes rotation of the carrousel A until a predetermined compartment of the carrousel which contains the optical disc to be played is aligned with a player B or C. The photointerrupter subassembly 31, which includes three optical sensors A, B and C, located adjacent the index holes 28 in the disc counts the index holes in relation to "home" hole 30 as the index holes 38 passes by the photointerrupter sensor subassembly 31 as shown in FIG. 12. Position counting is based on occurrences of the slot index signal (FIG. 12) and the motor 26 is stopped rotating when the selected compartment is in alignment with a player.

Figure 18:
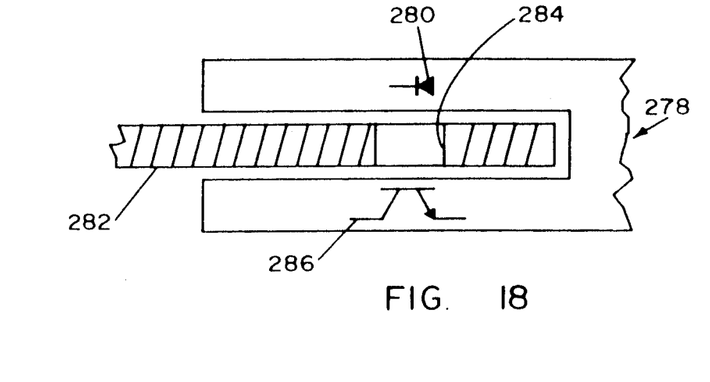
FIG. 18 is a diagrammatic view of a typical optical emitter and receiver assembly which is used in conjunction with the optical sliders and optical encoding wheel of the present invention.

FIG. 12 diagrammatically illustrates the optical encoding system which is used in conjunction with the present invention. As seen in FIG. 18, slot position detection is accomplished by optical edge detection of an appropriate optical encoding slot by "anding" the outputs from sensors A and B. The unique "home" position is determined by the simultaneous combination of sensors A, B and C. A lead-in indication which indicates an approximate position between slots, is accomplished by "oring" the outputs of sensors B and C.

Loading arm 58 is then actuated by motor 86 which actuates the loading arm 58 to slide the optical disc out of the carrousel and into the selected player. Loading is accomplished by placing the optical disc into the guide channels of guide members 183 and 184. The natural stop 196 of guide member 184 prevents the optical disc from being inserted too far in the compartment.

Sensor subassembly 101 (photointerrupter and optical slider subassembly) detects when loading is accomplished and causes the clamping mechanism of the player to release its clamping of the disc and causes actuation of motor 114 to effect rotation of the optical disc. As the disc rotates the optical (laser) pickup plays the disc.

After the disc is played, the slider and photointerrupter sensor subassembly 101 causes actuation of the unloading lever by motor 86 and the unloading lever moves the optical disc in a linear path from the player and back into the compartment of the carrousel in which it was stored. The process is repeated for each selected disc to be played.

To change an optical disc in the carrousel the user gives the address of the optical disc which the user wishes to replace. After completing the address, the turntable is made to rotate until the addressed compartment is aligned with slot 276 on the front of enclosure 12. Sensor subassembly 267 then actuates motor 258 for movement of the optical slider bar 244 to pivot the shift lever 238 of the insert/eject to eject the optical disc from the enclosure.

It is to be understood that although the automatic optical disc data storage and retrieval system is described as being operable (addressed) through a control panel 273 on the front of enclosure 12, the system can be addressed by the use of a keypad of a computer using software designed for this purpose.

It should be obvious from the foregoing that the automatic optical disc data storage and retrieval system enclosure of the present invention is designed to provide easy access to various subsystems for servicing or replacement. The two side panels have safety interlocks (not shown) that prevent the carrousel or optical disc player subsystems from operating when the side panels are detached. The system enclosure controls include an internal temperature sensor (not shown) to prevent system operation at either low or elevated temperatures due to the nature of optical disc media. Furthermore, the design of the carrousel grooves and the insert/eject levers is such that no part of the playing surface of the optical disc is ever touched by any mechanical component of the system.

The automatic optical disc data storage and retrieval system control electronics utilizes specialized integrated circuits (ASICs) to interface the numerous optical sensors to the control electronics microprocessor in a totally interrupt driven manner. All of the various rack/pinion motors and the carrousel positioning motor utilize sophisticated "adaptive" positioning control algorithms. This is an important feature because the various subsystems have certain manufacturing and temperature change effect tolerances that will be different for each manufactured unit. The adaptive nature of the positioning control algorithms allows each unit to adjust to its own operating environment to provide maximum performance and minimize long term wear on the various individual parts. The system control electronics implements various error checking sequences upon power-up to verify the operational readiness. One unique element of the power-up sequence is to perform a disc inventory and distribution analysis. Any non-uniform distribution will create a carrousel imbalance that must be compensated for by the carrousel positioning algorithm. In addition, a continuous operation check (watch dog operation) is performed every 1.6 seconds to insure that the software operating system is performing correctly.

I claim:

1. An automatic optical disc data storage and retrieval system comprising:
    an annular disc storage carrousel member having adjacent disc storage compartments, said storage carrousel member disposed for receiving and storing optical discs therein regardless of physical orientation of said storage carrousel member, said carousal having an upper annular plate and a lower circular plate, said plates disposed in spaced relation and having spaced aligned grooves thereon to define radially arranged compartments to receive an optical disc therein;
    an optical disc insert and ejector means for inserting and ejecting said optical discs into and out of said annular disc storage member;
    at least one optical disc player disposed for receiving and playing an optical disc;
    optical disc displacement means associated with said optical disc player for moving said optical disc radially into and out of a predetermined compartment of said annular disc storage member in a linear path;
    an enclosure for enclosing said annular disc storage member, said optical disc insert and ejector means, and said optical disc displacement means;
    and means for rotating said carrousel.

2. A system as set forth in claim 1 wherein said carrousel is provided with compartment indexing means, said indexing means disposed for selectively position a predetermined said compartment in predetermined locations in said enclosure.

3. A system as set forth in claim 2 wherein said indexing means includes means for stopping rotation of said carrousel responsive to a said predetermined compartment of said carrousel arriving at a said predetermined location.

4. A system as set forth in claim 3 wherein a first of said predetermined locations is a position of alignment of said predetermined compartment with said insert/ejector means, whereby a said optical disc is inserted or ejected into or out of a said predetermined compartment.

5. A system as set forth in claim 4 wherein a second of said predetermined locations is a position of alignment of said predetermined compartment with said disc player, whereby a said optical disc is inserted or ejected into or out of said player.

6. A system as set forth in claim 5 including biasing means mounted in said grooves of said lower plate of said carrousel.

7. A system as set forth in claim 6 wherein said biasing means is a spring loaded roller.

8. A system as set forth in claim 1 wherein said at least one optical disc player includes clamping means to receive a said optical disc in secured, rotational relation therein.

9. A system as set forth in claim 8 wherein said player includes loading means for moving said optical disc linearly into said clamping means wherein said optical disc is held in either secured relation or unsecured rotational relation in said clamping means.

10. A system as set forth in claim 9 wherein said player is provided with unloading means for moving said disc from said clamping means in a linear path and radially into said carrousel.

11. A system as set forth in claim 10 wherein said clamping means includes a pair of plates disposed in mutually pivotal relation and gripping means for gripped relation of said optical disc therebetween to provide for the secured and rotational relation of said optical disc in said clamping means.

12. A system as set forth in claim 11 wherein said loading and unloading means includes a pair of spaced, pivotally mounted arms, each arm having an arcurate configuration to retain said optical disc therein for movement between said clamping means and said carrousel.

13. A system as set forth in claim 12 including an optical pickup means mounted on a second of said pair of plates for playing said disc mounted in said clamping means.

14. A system as set forth in claim 13 including cam means disposed for moving said plates between open and closed positions.

15. A system as set forth in claim 14 including guide means mounted adjacent a first of said plates for engaged relation against the periphery of said optical disc.

16. A system as set forth in claim 15 where said guide means includes a pair of spaced guide members each having a guide channel therein.

17. A system as set forth in claim 16 including biasing means mounted in said guide channel of at least one of said guide members.

18. A system as set forth in claim 17 wherein said biasing means is a spring urged roller.

19. A system as set forth in claim 14 wherein said clamping means includes a slider bar mounted on said chassis of player, an electric motor mounted on said chassis of said player and operatively connected to said slider bar for sliding movement thereof on said chassis of said player, said cam means including a pair of cam surfaces mounted on said slider, each of said plates of said pair of plates having a cam follower member mounted thereon and extending into said cam surfaces for movement therein in response to movement of said cam surfaces to simultaneously pivotally move said plates for the clamping or unclamping function.

20. A system as set forth in claim 1 wherein said optical disc insert and ejector means comprises a chassis having a pivotally mounted arcuate arm disposed for receiving said optical disc therein and for moving said optical disc radially into or out of said carrousel in a linear path.

21. A system as set forth in claim 20 including means for pivotally moving said arm.

22. A system as set forth in claim 21 wherein said chassis of said disc insert and ejector means is provided with an electric motor mounted thereon, and a slider bar operatively connected to said motor for sliding movement on said chassis, said arcuate arm being pivotally mounted on said slider bar for pivotal movement responsive to sliding movement of said slider bar.

23. A system as set forth in claim 22 including means for actuation of said motor.

24. An automatic optical disc data storage and retrieval system comprising:
 an annular disc storage member having adjacent disc storage compartments, said storage member disposed for receiving and storing optical discs therein;
 an optical disc insert and ejector means for inserting and ejecting said optical discs into and out of said annular disc storage member;
 at least one optical disc player disposed for receiving and playing an optical disc;
 optical disc displacement means associated with said optical disc player for moving said optical disc radially inwardly into said annular disc storage member into a predetermined said compartment thereof in a linear path;
 an enclosure for enclosing sand annular disc storage member, sand optical disc insert and ejector means, and said optical disc displacement means; and,
 first retaining means for retaining said discs in said storage member regardless of physical orientation of said enclosure, said first retaining means comprising a member mounted in each said groove of said lower plate, said member disposed for biased relation along the peripheral surface of each said discs.

25. A system as set forth in claim 24 including second retaining means for retaining a said disc in said optical disc player regardless of physical orientation of said enclosure.

26. A system as set forth in claim 24 wherein said member is a spring biased roller.

27. An automatic optical disc data storage and retrieval system comprising:
 an annular disc storage member having adjacent disc storage compartments, said storage member disposed for receiving and storing optical discs therein regardless of physical orientation of said storage member;
 an optical disc insert and ejector means for inserting and ejecting said optical discs into and out of said annular disc storage member;
 at least one optical disc player disposed for receiving and playing an optical disc;
 optical disc displacement means associated with said optical disc player for moving said optical disc radially into and out of a predetermined compartment of said annular disc storage member in a linear path;
 an enclosure for enclosing said annular disc storage member, said optical disc insert and ejector means, and said optical disc displacement means; and
 clamping means carried by said at least one optical disc player for receiving an optical disc in secured, rotational relation therein, said clamping means including a pair of spaced movable members for receiving said optical disc in the space therebetween; and, means for moving aid movable members into and out of engagement with said optical disc.

* * * * *